(12) United States Patent
Ji et al.

(10) Patent No.: US 11,164,306 B2
(45) Date of Patent: Nov. 2, 2021

(54) VISUALIZATION OF INSPECTION RESULTS

(71) Applicant: INTERNATIONAL BUSINESS MACHINES CORPORATION, Armonk, NY (US)

(72) Inventors: Peng Ji, Nanjing (CN); Guo Qiang Hu, Shanghai (CN); Jingchang Huang, Shanghai (CN); Fan Li, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 140 days.

(21) Appl. No.: 16/707,097

(22) Filed: Dec. 9, 2019

(65) Prior Publication Data
US 2021/0174482 A1 Jun. 10, 2021

(51) Int. Cl.
*G06T 7/00* (2017.01)
*G06T 7/11* (2017.01)
(Continued)

(52) U.S. Cl.
CPC ............ *G06T 7/001* (2013.01); *G06N 3/084* (2013.01); *G06N 5/046* (2013.01); *G06N 20/00* (2019.01);
(Continued)

(58) Field of Classification Search
CPC . G06T 2207/20081; G06T 2207/20084; G06T 7/0004; G06T 2207/20021;
(Continued)

(56) References Cited

U.S. PATENT DOCUMENTS

| 7,376,269 B2 | 5/2008 | Klassen et al. |
| 2005/0069179 A1* | 3/2005 | Hwang ............... G06K 9/036 |
| | | 382/124 |

(Continued)

FOREIGN PATENT DOCUMENTS

CN 109472769 A 3/2019

OTHER PUBLICATIONS

Ding Shumin, Liu Zhoufeng and Li Chunlei, "AdaBoost learning for fabric defect detection based on HOG and SVM," 2011 International Conference on Multimedia Technology, 2011, pp. 2903-2906, doi: 10.1109/ICMT.2011.6001937.*

(Continued)

*Primary Examiner* — Li Liu
(74) *Attorney, Agent, or Firm* — Cantor Colburn LLP; Joseph Petrokaitis

(57) ABSTRACT

Methods, systems and computer program products for providing improved visualization of inspection results are provided. Aspects include receiving an image from a connected camera by a computing device and processing the image by a graphics processing unit to divide the image into a plurality of image blocks. Responsive to inputting the processed image into a trained model, a plurality of image areas within the processed image is identified. Each image area is associated with an importance level and includes a unique set of image blocks. A sequence of image blocks is determined based on an importance level associated with each of the plurality of image blocks, wherein the sequence includes a list of image blocks in descending order by the importance level of each image block. The image blocks are stored in order of the sequence of image blocks by the server.

20 Claims, 15 Drawing Sheets

(51) Int. Cl.
*G06T 9/00* (2006.01)
*G06N 20/00* (2019.01)
*G06N 5/04* (2006.01)
*G06N 3/08* (2006.01)

(52) U.S. Cl.
CPC ............... *G06T 7/11* (2017.01); *G06T 9/00* (2013.01); *G06T 2207/20021* (2013.01); *G06T 2207/20081* (2013.01); *G06T 2207/20084* (2013.01)

(58) Field of Classification Search
CPC ...... G06T 2207/30108; G06K 2209/19; G06K 9/6267; G06K 9/66
See application file for complete search history.

(56) References Cited

U.S. PATENT DOCUMENTS

| | | | |
|---|---|---|---|
| 2016/0163035 A1 | 6/2016 | Chang et al. | |
| 2017/0195699 A1* | 7/2017 | Xu | H04N 19/428 |
| 2018/0268257 A1* | 9/2018 | Ren | G06T 7/001 |
| 2020/0364889 A1* | 11/2020 | Tsai | G06K 9/3233 |
| 2020/0394784 A1* | 12/2020 | Toth | G06T 7/0004 |
| 2021/0027444 A1* | 1/2021 | Cheng | G06K 9/4609 |

OTHER PUBLICATIONS

Baeza, Ismael, et al. "ROI-based procedures for progressive transmission of digital images: A comparison." Mathematical and computer modelling 50.5-6 (2009): 849-859.*

Cheng et al., "A Mobile Vision Inspection System for Tiny Defect Detection of Smooth Car-Body Surface Based on Deep Ensemble Learning," Measurement Science and Technology, Mar. 28, 2019, 3 pages.

Khan, "Everything You Need to Know About Visual Inspection With AI," Nanonets.com; URL: https://nanonets.com/blog/ai-visual-inspection/; Retrieved Sep. 13, 2019; 30 pages.

Tomczak et al., "Image Defect Detection Methods for Visual Inspection Systems," CAD Systems in Microelectronics, Feb. 2007, pp. 454-456.

* cited by examiner

| 8 | 16 | 24 | 32 | 40 | 48 | 56 | 64 | 72 |
|---|----|----|----|----|----|----|----|----|
| 7 | 15 | 23 | 31 | 39 | 47 | 55 | 63 | 71 |
| 6 | 14 | 22 | 30 | 38 | 46 | 54 | 62 | 70 |
| 5 | 13 | 21 | 29 | 37 | 45 | 53 | 61 | 69 |
| 4 | 12 | 20 | 28 | 36 | 44 | 52 | 60 | 68 |
| 3 | 11 | 19 | 27 | 35 | 43 | 51 | 59 | 67 |
| 2 | 10 | 18 | 26 | 34 | 42 | 50 | 58 | 66 |
| 1 | 9  | 17 | 25 | 33 | 41 | 49 | 57 | 65 |

VISUALIZATION OF INSPECTION RESULTS

BACKGROUND

The present invention generally relates to computer processing systems, and more specifically, to providing improved visualization of inspection results.

Manufacturing processes use a variety of quality control techniques. In an example technique, high resolution images of goods being manufactured are captured by a graphical processing unit (GPU). The high resolution images are sent to a remote machine, and an inspector uses a client application running on the remote machine to perform visual inspection of the image.

SUMMARY

Embodiments of the present invention are directed to providing improved visualization of inspection results. A non-limiting example computer-implemented method includes receiving an image by a processor system. The method also includes processing, by the processor system, the image to divide the image into a plurality of image blocks. Responsive to inputting the processed image into a model that has been trained to detect possible defects represented in an image, the method also includes identifying a plurality of image areas within the processed image by the processor system. Each image area is associated with an importance level and each image area comprises a unique set of image blocks of the plurality of image blocks. The method also includes determining, by the processor system, a sequence of image blocks based on an importance level associated with each of the plurality of image blocks. The sequence includes a list of image blocks in descending order by the importance level of each image block. The method also includes storing, by the processor system, the image blocks in order of the sequence of image blocks.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3A depicts an example representation of a processed image that can be an input to a defect detection model according to embodiments of the present invention;

Figure 1:
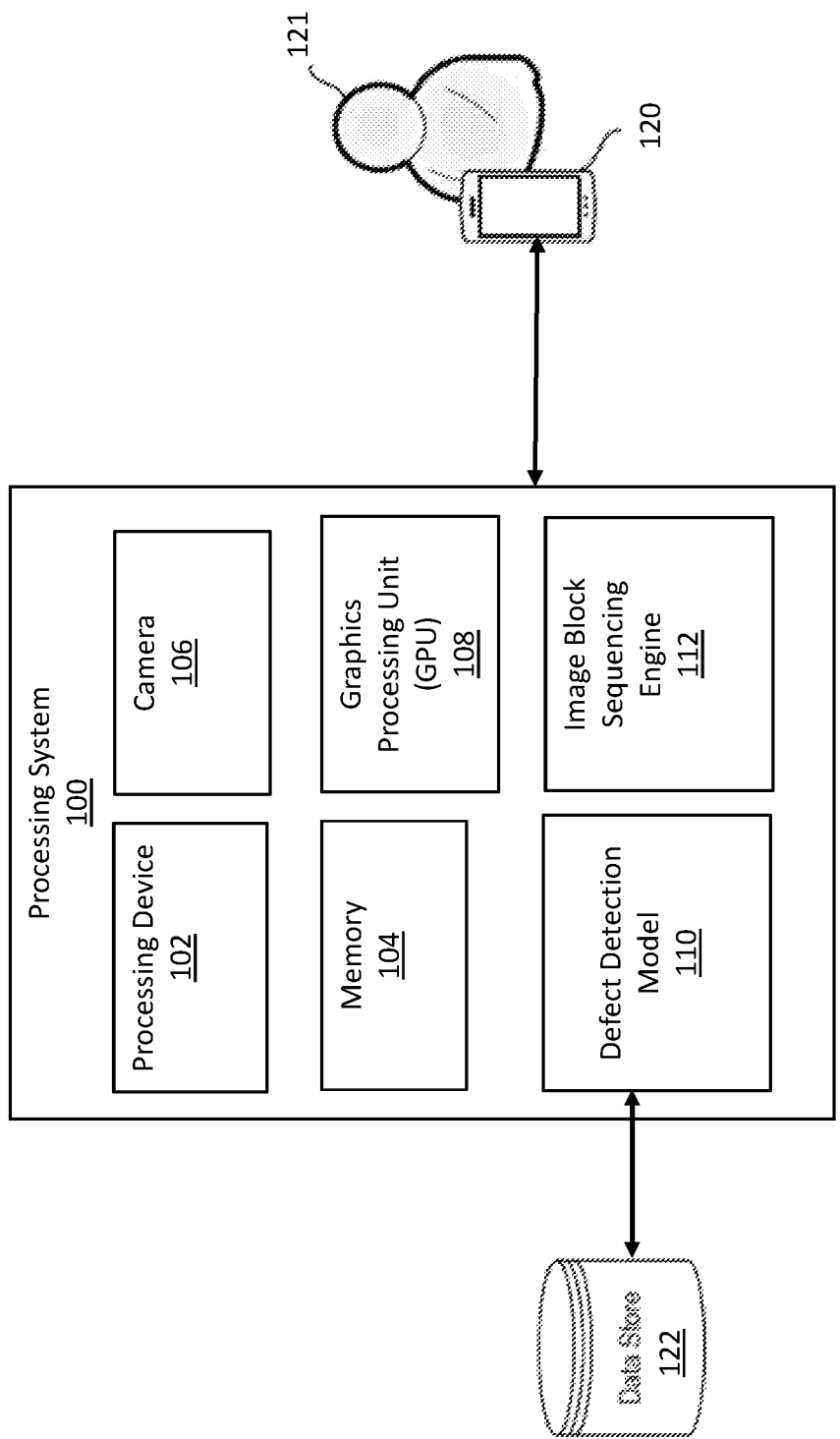
FIG. 1 illustrates a system capable of implementing a visualization method according to one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Quality control systems for manufacturing processes that involve taking high resolution images of an object of manufacture are commonly processed by a powerful GPU on a local server before transmitting the image data to a remote device for inspection and review by a human operator of the remote device. While it is useful to allow a remote human operator to view images of an article of manufacture to identify defects as a quality control check, due to the large amount of data that make up such high resolution images, such systems require a large amount of memory to store the images, as well as a long time to transmit the images to the remote device. The remote device also takes a long time to render the image for inspection by the human operator.

Turning now to an overview of the aspects of the invention, one or more embodiments of the invention address the above-described shortcomings of the prior art by providing techniques that improve the process of visualization of inspection results by reducing the amount of image data that is stored by the server, transmitted to the remote device, and rendered by the remote device for inspection by a human operator. These techniques further reduce the amount of memory and computing resources used to carry out the remote inspection process and accelerate the time it take to store, transmit and render an image for inspection, thereby increasing the efficiency of the review process. A method according to embodiments of the invention includes inputting an image of an object being manufactured into a trained defect detection model (such as a neural network) to identify areas of the image that are suspected to represent a possible defect in the object. The trained model can define areas of the image and determine an associated importance level of each area, where the importance level is representative of a probability that the area shows a defect in the object. For example, in some embodiments of the invention, the model can break the image into different areas and classify each area is either being of high, medium or low importance. In accordance with aspects of the invention, areas of high importance can be considered to have a high confidence of depicting a defect; areas of medium importance can be considered to have a medium level of confidence of depicting a defect; and areas of low importance can be considered to have a low confidence of depicting a defect. As will be understood, a human operator inspecting the image for defects will naturally be most interested in the areas of high importance, followed by the areas of medium importance, followed by the areas of low importance. Embodiments of the invention allow for the storage, transmission and rendering of image blocks in a specified sequence based on the importance level of each block/area of the image, thereby allowing the human operator to receive and inspect the most important (i.e., most likely to show a defect) areas first. According to some embodiments of the invention, the disclosed techniques can greatly reduce the amount of data that is stored and transmitted by not storing or transmitting image blocks of low importance. Rather, in some embodiments of the invention, the remote device can pre-store a reference image and upon receiving image blocks of an image to be inspected that have high and/or medium levels of importance, the remote device can modify the reference image to replace the corresponding image blocks with the received image blocks, thereby reducing the amount of data and the time it takes to render an image for inspection, while still maintaining important image data that is most likely to depict a defect.

Turning now to a more detailed description of aspects of the present invention, FIG. 1 depicts a system 100 for providing improved visualization of inspection results is generally shown in accordance with one or more embodiments of the present invention. The various components, modules, engines, etc. described regarding FIG. 1 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 102 for executing those instructions. Thus a system memory (e.g., memory 104) can store program instructions that when executed by the processing device 102 implement the engines described herein. Other engines can also be utilized to include other features and functionality described in other examples herein.

Figure 2:
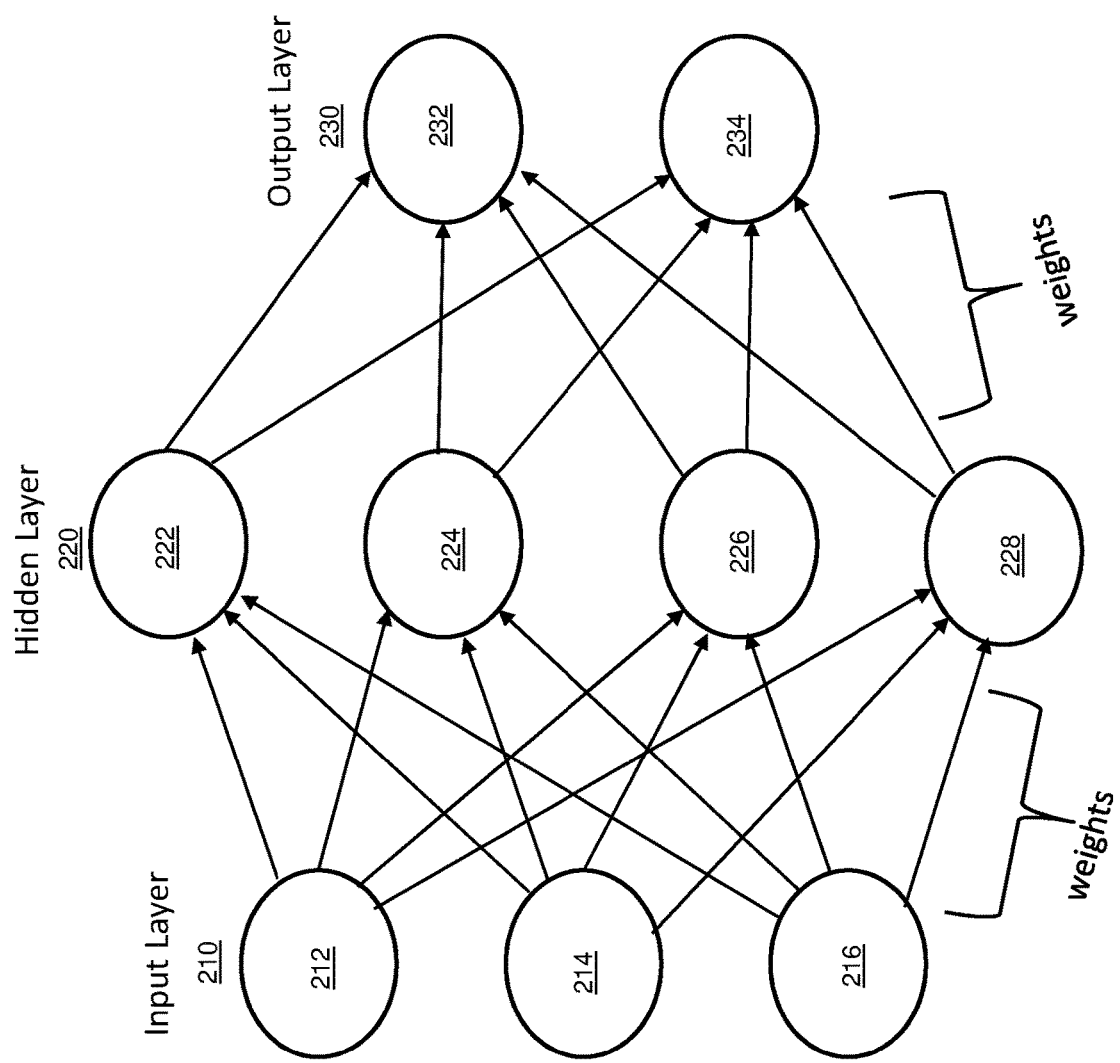
FIG. 2 depicts an example neural network architecture according to embodiments of the present invention.

The processing system 100 includes the processing device 102, the memory 104, a camera 106, graphics processing unit (GPU) 108, defect detection model 110 and an image sequencing engine 112. According to some embodiments, the camera 106 can be positioned as part of an assembly line. For example, in some embodiments, the camera 106 can be positioned on a portion of an assembly line or assembly process that allows the camera 106 to take one or more images of an item of manufacture, such as for example, a liquid crystal display (LCD) panel or screen for a television, tablet, smart phone or the like. Other applications can include, for example, checking the quality of a paint job, detecting foreign objects in food or drink products, checking for defects in manufacturing processes (e.g., metal welding), or any other application that may involve a quality control check for defects. According to some embodiments, the camera can have a local and/or direct connection to the processing device 102, memory 104, GPU 108 and/or data store 122 so that images obtained by the camera 106 can be quickly received and manipulated by the other components of processing system 100. In some embodiments, the GPU 108 can be a specialized electronic circuit that is designed to rapidly manipulate and alter memory to accelerate the creation of images in a frame buffer intended for output to a display device. The GPU 108 can be configured to process an image obtained by the camera 100 and can partition or divide the image into a plurality of image blocks. For example, FIG. 2 shows an example partitioning of an image 200 into 72 image blocks (labeled 1 through 72 in the figure). Each image block can be an area of the image having a standardized size. For example, in some embodiments, each image block can have a size of one pixel. In some embodiments, each image block can be of a size having a specified number of pixels (e.g., 4 pixels, 9 pixels, 16 pixels, etc.) that are arranged in a square or rectangular shape. Each image block can be separately stored in memory (e.g., memory 104 or data store 122), separately transmitted from processing device 100 to remote device 120 and/or separately rendered by remote device 120.

The processing system 100 can be configured to communicate with a remote device 120, which can be configured to render images for review by a user 121. For example, an image obtained by camera 106 and processed by GPU 108 can be transmitted to remote device 120 for rendering and inspection by user 121. According to some embodiments, the processing system 100 can communicate with remote device 120 and/or data store 122 via a communications network that can be one or more of, or a combination of, public (e.g., Internet), private (e.g., local area network, wide area network, virtual private network), and can include wireless and wireline transmission systems (e.g., satellite, cellular network, terrestrial networks, etc.). According to some embodiments, processing system 100 can be locally connected to data store 122 (e.g., via a wired connection). Processing system 100 can store and access data stored by data store 122. For example, processing system 100 can store one or more sequences of image blocks using data store 122. In exemplary embodiments, remote device 120 can include, but is not limited to, a desktop computer, a laptop, a tablet, a smartphone, a wearable device such as a smartwatch, an augmented reality headset, a television, a computer system such as the one shown in FIG. 9, or any other suitable electronic device. Remote device 120 can include a screen for displaying a rendered image to a user and one or more input devices (e.g., mouse, keyboard, touchscreen, etc.) to allow a user to navigate the image (e.g., scroll, zoom-in, zoom-out, etc.) for viewing different portions of the image.

The defect detection model 110 can be a model that has been trained to detect possible defects of a particular object or item of manufacture represented in an image. In some embodiments, defect detection model 110 can be a machine learning model that has undergone supervised training to detect potential defects in a particular type of item. For example, in some embodiments, the defect detection model 110 can be a machine learning (e.g., neural network) model that has been specifically trained to detect possible defects in the surface of an LCD panel (or screen) based on an image of the LCD panel (e.g., obtained by camera 106 following the manufacture of the LCD panel), detecting inconsistencies in a paint job (e.g., paint on a portion of an automobile), detecting foreign objects in a food or drink product (e.g., checking for pebbles, bugs or the like in tea), detecting defects in a manufacturing process (e.g., a metal welding) or any other such quality control process that can involve a visual inspection. In this case, a defect can include for example, a scratch, a crack, a discoloration or any other physical feature of the object that is undesirable and/or would interfere with the operation or enjoyment of the object.

The phrase "machine learning" broadly describes a function of an electronic system that learns from data. A machine learning system, engine, or module can include a trainable machine learning algorithm that can be trained, such as in an external cloud environment, to learn currently unknown functional relationships between inputs and outputs.

Machine learning functionality can be implemented using an artificial neural network (ANN) that has the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

According to some embodiments, the model trained by the model generation engine 106 can be a machine learning model that is trained using an ANN (which may also simply be referred to as a "neural network"). FIG. 2 depicts a simplified example of a neural network 200. As will be understood by those of skill in the art, neural networks can be used to estimate or approximate systems and functions that depend on a large number of inputs and are generally unknown. Neural networks use a class of algorithms based on a concept of inter-connected "neurons." In a typical neural network, neurons have a given activation function that operates on the inputs. By determining proper connection weights (a process also referred to as "training"), a neural network achieves efficient recognition of a desired patterns, such as images and characters. Oftentimes, these neurons are grouped into "layers" in order to make connections between groups more obvious and to each computation of values. Training the neural network is a computationally intense process.

ANNs are often embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. The activated output neuron determines which character was read.

In one or more examples, weight elements are stored in a weight storage element such as a capacitor and read by a weight reader, such as a field effect transistor (FET). Alternatively, or in addition, the weight storage elements can be digital counters (e.g. J-K flip-flop based counters), a memory storage device, or any other electronic circuit that can be used for storing the weight. Here, "weight" refers to a computational value being used during computations of an ANN as described further.

As shown in FIG. 2, a neural network 200 includes an input layer 210, a hidden layer 220, and an output layer 230. Although only one input layer, one hidden layer and one output layer are shown, in practice, an input layer will have many inputs and multiple hidden layers can be provided. The input layer 210 is made up of a plurality of inputs 212, 214, 216, the hidden layer(s) are made up of a plurality of hidden layer neurons 222, 224, 226 and 228, and the output layer is made up of a plurality of output neurons 232, 234 (which may be referred to as the "final layer" or "output layer" of the neural network). It should be understood that a neural network is not limited to the number of neurons shown in the neural network 200 of FIG. 2, which only depicts a few neurons and layers for illustrative purposes. As shown by FIG. 2, the neurons of the various layers are interconnected by pathways (or "paths") that each have an associated weight. Prior to training a model, the neural network is initialized by populating all of the weights with pseudo-random values. Generally speaking, each neuron of the hidden layer 220 will also have an associated "bias" value, which can be initially set to zero for each. As will be appreciated by those of skill in the art, as data is input to the neural network via the input layer 210, the data propagated along the paths shown by multiplying the value of the data by the dot product of the weight of the path and then adding the bias of the destination neuron and then passed through an activation function to convert the input signal to an output signal. The output layer 230 provides a classification of the data input that can be compared to the associated label of the data input to determine if the classification was correct or incorrect. Following this forward propagation through the neural network, the system performs a backward propagation to update the weight parameters of the paths and the biases of the neurons. These steps can be repeated to train the model by updating the weights and biases until a cost value is met or a predefined number of iterations are run.

According to some embodiments, training data, such as a plurality of training images of a particular object having zero or more known defects can be used to train the model. The plurality of training images can be received by the input layer 210 (e.g., each pixel of an image is received as an input value to an input node 212, 214, 216, etc.) and the values are propagated through the paths of the neural network 200 by applying the activation functions, weights and biases and updating the weights and biases as described above to train the model. Once a predetermined number of iterations are performed or a predetermined amount of training images have been input into the neural network, the model can be considered to have been trained and can now be used for its intended purpose (i.e., identifying defects in images of a particular type of object). A new image can be input into the trained model, and the model can output confidence levels associated with each image block of the image that represent the degree of confidence that the image block shows a defect. The defect detection model 110 can determine boundaries around a plurality of adjacent image blocks, based on for example, a degree of similarity of confidence levels of the adjacent blocks. Thus, areas of adjacent image blocks that may collectively represent a single defect can be identified by the defect detection model 110. The defect detection model 110 can assign an importance to each image area and/or image block based on the associated confidence level and/or a heatmap generated by the defect detection model 110. A heatmap can be an internal output of a detection model that is trained to detect defects for a given type of image. The heatmap can describe to what extent a set of adjacent pixels of an image represent a defect. As such, the heatmap can be used to locate where one or more defects are within an image and can be used as the support for the final output bounding box(es) that define the locations of possible defects.

According to some embodiments, the defect detection model 110 can be a convolutional neural network (CNN). As will be understood by those of skill in the art, a CNN is a class of deep neural networks that is commonly applied to analyzing visual imagery.

A CNN is similar to an ANN in that both utilize interconnected electronic neurons. However, a CNN has neural layers whose sizes are based on filter sizes, stride values, padding values, etc. and a CNN utilizes a convolution scheme to analyze image data. A CNN gets its "convolutional" name based on a convolution (i.e., a mathematical operation on two functions to obtain a result) of filtering and pooling pixel data (a mathematical operation on two functions) in order to generate a predicted output (obtain a result).

In accordance with one or more embodiments of the present invention, an input layer of a CNN includes neurons that receive data that describes pixels from a photograph, such as an image of an LCD panel. The neurons from the input layer of the CNN connect neurons in a middle layer, which connect to neurons in the output layer. Each neuron functionally includes at least four features: a mathematical function, an output value, a weight, and a bias.

For example, assume that a first neuron is sending the results of its analysis of a piece of the housecat image to a second neuron. The second neuron has a first weight that defines how important data coming specifically from the first neuron is. If the data is important, then data coming from the first neuron is weighted heavily, thus causing the mathematical function (s) within the second neuron to generate a higher output, which will have a heavier impact on neurons in the output layer. Similarly, if a third neuron has been determined to be significant to the operations of the second neuron, then the weight in a first neuron will be increased, such that the second neuron receives a higher value for the output of the mathematical function in the first neuron. These weights are adjustable for one, more, or all of the neurons in the CNN, such that a reliable output will result from output layer. In one or more embodiments of the present invention, finding the values of weights and bias values is done automatically by training the neural network. In one or more embodiments of the present invention, manual adjustments are applied to tune the hyperparameters such learning rate, dropout, regularization factor and so on. As such, training a neural network involves running forward propagation and backward propagation on multiple data sets until the optimal weights and bias values are achieved to minimize a loss function. The loss function measures the difference in the predicted values by the neural network and the actual labels of the different inputs.

When manually adjusted, the weights are adjusted by the user, sensor logic, etc. in a repeated manner until the output from the output layer matches expectations. For example, assume that an input layer receives pixel values (color, intensity, shading, etc.) from pixels in a photograph of an LCD panel with no defect. If the output from output layer includes a first output layer neuron/node, which is associated with "LCD panel with no defect", then the weights (and/or the mathematical function and/or biases in "upstream" nodes/neurons) are adjusted until the first output layer neuron/node contains the highest value in the output layer when pixel data from a photograph of an LCD with no defect is input into input layer.

When automatically adjusted, the weights (and/or mathematical functions and/or biases) are adjusted using "back propagation", in which weight values and/or biases and/or mathematical functions of the neurons are adjusted by using a "gradient descent" method that determines which direction each weight value should be adjusted to. This gradient descent process moves the weight in each neuron in a certain direction until the output from the output layer improves (e.g., the first output layer neuron has a higher value than a second output layer node that is associated with the label "LCD panel with no defect".

A CNN process includes 1) a convolution stage, followed by a 2) pooling stage and a classification stage. A convolution/pooling scheme to analyze image data is presented in CNN convolution process. Pixel data from a photographic image (e.g., housecat image) populates an input table. Each cell in the input table represents a value of a pixel in the photograph. This value is based on the color and intensity for each pixel. A subset of pixels from the input table is associated with a filter. That is, the filter is matched to a same-sized subset of pixels by sliding the filter across the input table. The filter slides across the input grid at some predefined stride (i.e., one or more pixels). Thus, if the stride is "1", then the filter slides over in increments of one (column) of pixels.

The filter is applied against each pixel subset using a mathematical formula. That is, the values in the filter are added to, subtracted from, multiplied by, divided by, or otherwise used in a mathematical operation and/or algorithm with the values in each subset of pixels.

In some embodiments of the invention, the convolution step also includes use of an activation function, which transforms the output of the convolution operation into another value. One purpose of the activation function is to create nonlinearity in the CNN. The specific activation function depends on a variety of design factors based on the particular embodiment of the invention being utilized. Suitable activation functions include a rectified linear unit (ReLU), a leaky ReLU, a sigmoid function, a tanh function, and the like.

In embodiments of the invention, each subset of pixels uses the same filter. However, in some embodiments of the invention, the filter used by each subset of pixels is different, thus allowing a finer level of granularity in creating the feature map.

Once the CNN is optimized by adjusting weights and/or mathematical functions and/or biases in the neurons, by adjusting the stride of movement of the pixel subset, and/or by adjusting the filter, the optimized CNN is trusted to be able to recognize similar objects in similar photographs. This optimized CNN is used to infer (hence the name inference processing) that the object in a new photograph is the same object that the CNN has been trained to recognize.

Assume that pixels from a photograph are used as inputs to the input table, using a CNN that has been previously defined and optimized to recognize defects in an image of an LCD panel. Assume further that a series of pixel subsets are convolved, thus resulting in a set of feature maps. Once the feature maps are generated, they are pooled into smaller pooled tables in order to reduce the dimensionality of the values, thereby reducing the number of parameters and computations required in the CNN process. The pooled tables are convoluted to create new (and even more compressed) feature maps, which are pooled to create even more compressed pooled tables.

The pooled tables (which in embodiments of the invention are actually a single table) are "unrolled" to form a linear vector, which can be a fully connected layer. The fully connected layer is connected to a prediction output, including for example a first prediction output (e.g., a defect exists) and second prediction output (e.g., no defect exists).

For example, assume that for a prediction output to be considered accurate, it must have an arbitrarily chosen total value of 10 or greater for the sum of values from cells in the fully connected layer to which it is connected. As will be understood by those of skill in the art, a confidence (which can be described as a confidence level), can be calculated from a softmax layer of a neural network to determine an extent to which the model believes its output is true. In one or more embodiments, an output function, such as a softmax function, amplifies larger output values, attenuates smaller output values, and normalizes all output values in order to ensure that their total sum is one. That is, rather than assigning an arbitrary number (e.g., 10) as being what the sum total of values in certain cells from the connected layer must exceed in order to indicate that a particular entity (e.g., defect exists) is portrayed in the new photograph, an output function such as a softmax function dynamically adjusts the output values and then normalizes them, such that they sum up to 1.0 or some other predetermined number. Thus, while the described values describe the concept of output values describing entities in the photographs, in practice a static threshold value is not used in certain embodiments. Rather, in some embodiments, the system utilizes a normalized summation (as just described), in order to further control the output characteristics, thus more accurately determining the label of the object in the photograph.

Figure 3B:
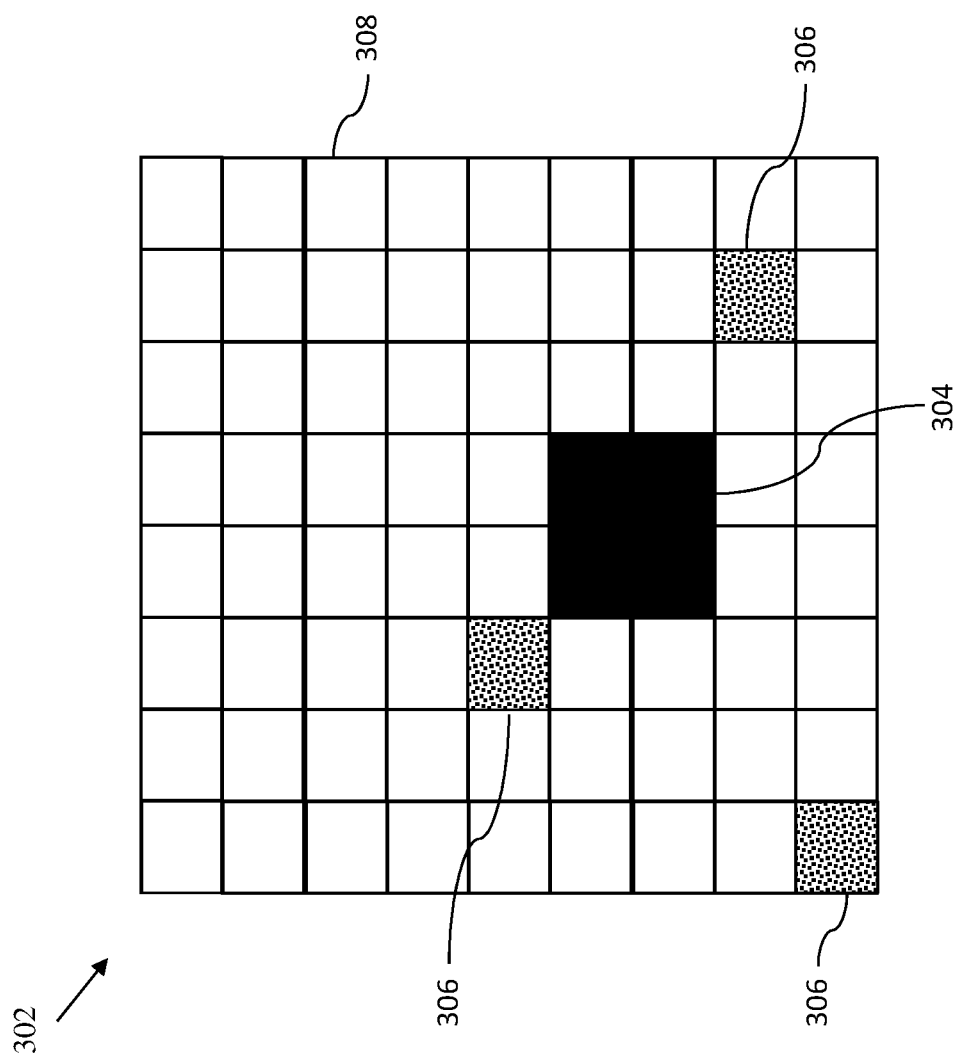
FIG. 3B depicts an example representation of an importance-based output of a defect detection model according to embodiments of the present invention.

In some embodiments, the defect detection model 110 can receive an image (such as an imaged processed by the graphics processing unit 108) of a type of item of which it has been trained to detect defects, such as for example, an image of an LCD panel, and the model can be applied to the image to generate a heat map and a set of boundaries that define image areas made up of one or more image blocks that each have an associated importance level. In other words, the defect detection model 110 can identify areas of the image in which there is a suspected defect with an associated confidence level which corresponds to the importance level (i.e., a higher level of confidence that the area contains a defect corresponds to the area having a higher importance level). For example, FIG. 3A depicts a representation of an outline of an image 300 that can be input to the defect detection model 110 for detection of possible defect areas. It should be understood that for the purposes of illustrating the operation of the system, image 300 does not show the content of the image, but rather shows that the overall area of the image has been divided into 72 image blocks (labeled from "1" to "72") by, for example, the graphics processing unit 108. FIG. 3B shows an example importance-based output image 302 that is generated by the defect detection model 110 based on the input image 300. In this example, the defect detection model 110 has identified a first image area 304 that are associated with a high importance level, a set of 3 second image areas 306 that are associated with a medium importance level, and a third (i.e., remaining) image area 308 that is associated with a low importance level, based on the heat map and boundaries output determined by the defect detection model 110. When compared to the image 300 shown in FIG. 3B, it is clear that the first image area 304 that has a high importance level corresponds to image blocks 44, 45, 52 and 53, whereas the set of second areas that are associated with a medium importance level corresponds to blocks 35, 63 and 65, and third image areas that has a low importance level corresponds to the remaining image blocks. As explained herein, each image block can be stored, transmitted, and/or rendered individually in a specified sequence.

According to some embodiments, the defect detection model 110 can also determine "distance_to_results" values associated with one or more image blocks or image areas that represents a distance that the associated image block/area is away from an image block area with the highest confidence value or in some embodiments, it can represent a distance to the nearest image block area that has a high confidence value. In some embodiments, the "distance to results" value can be associated with an image area that has a low or medium level of importance and can refer to a distance away from the nearest image area having a highest importance level. According to some embodiments, an image area having the highest importance level can be an image area with a high importance level that cover the largest number of image blocks. According to some embodiments, an image area having the highest importance level can be an image area having the highest confidence level as determined by the defect detection model 110. As will be described a below, in some embodiments, such "distance to results" values can be used in determining a sequence of image blocks for storage, transmission and/or rendering.

The image block sequencing engine 112 can determine a sequence of image blocks for storage, transmission and/or rendering based on an importance-based output image (e.g., such as image 302) generated by the defect detection model 110. The image block sequencing engine 112 can be configured to order each image block of the image (e.g., image 300) in descending order from the image block having the highest importance level to the image block having the lowest importance level. In this way, image blocks can be stored, transmitted and/or rendered in this sequence to ensure that the most important image blocks (i.e., the image blocks that are most likely to represent a defect) are presented to a user 121 (i.e., at the remote device 120) for inspection first, in order to accelerate the review of results and decrease the amount of data that is transferred and rendered.

According to some embodiments, the image block sequencing engine 112 can determine a sequence of image blocks based on an importance level associated with each of the plurality of image blocks of an image by placing each image block of all image areas having a high importance level at a beginning of the sequence, placing each image block of all image areas having a medium importance level at the middle of the sequence and placing each image block of all image areas having a low importance at the end of the sequence. According to some embodiment, the image block sequencing engine 112 can determine an order of each image block having a medium importance level within the middle of the sequence based on the "distance to results" values associated with these blocks. For example, image areas/blocks having a medium importance level that are closer to image areas/blocks having a high importance level (or alternatively, to the image area/block having the highest importance level) can be considered to be more important than image areas/blocks having a medium importance level that are further away from the image areas/blocks having a high importance level. Accordingly, in some embodiments, the image block sequencing engine 112 can order the image blocks associated with image areas having a medium importance based on the "distance_to_results" values such that image blocks having a smaller "distance_to_results" value are placed before image blocks having larger "distance_to_results" values in the sequence.

Figure 4A:
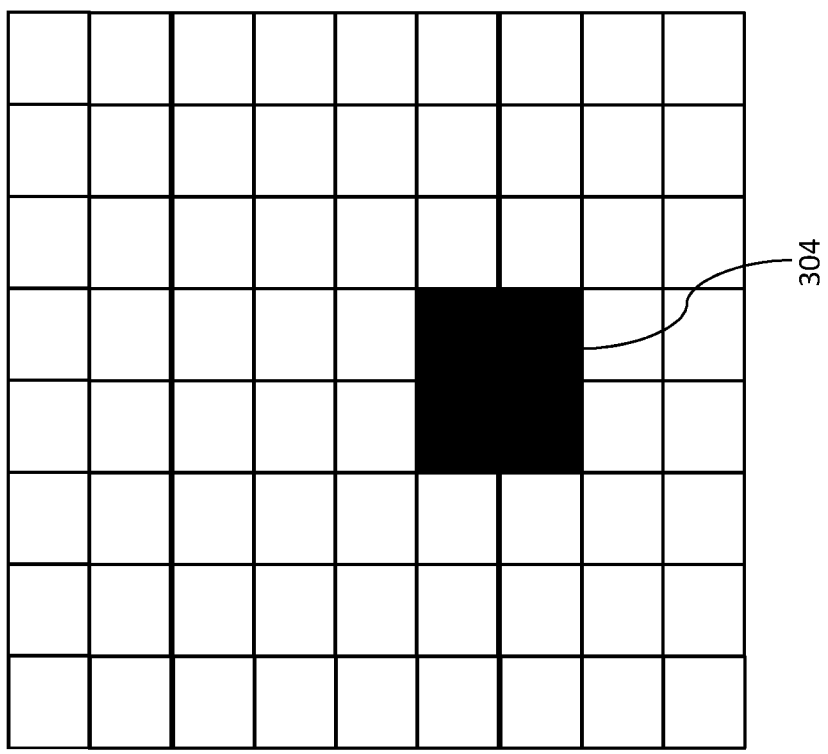
FIG. 4A depicts a first stage of an example importance-based image block storage sequence according to embodiments of the present invention.
Figure 4B:
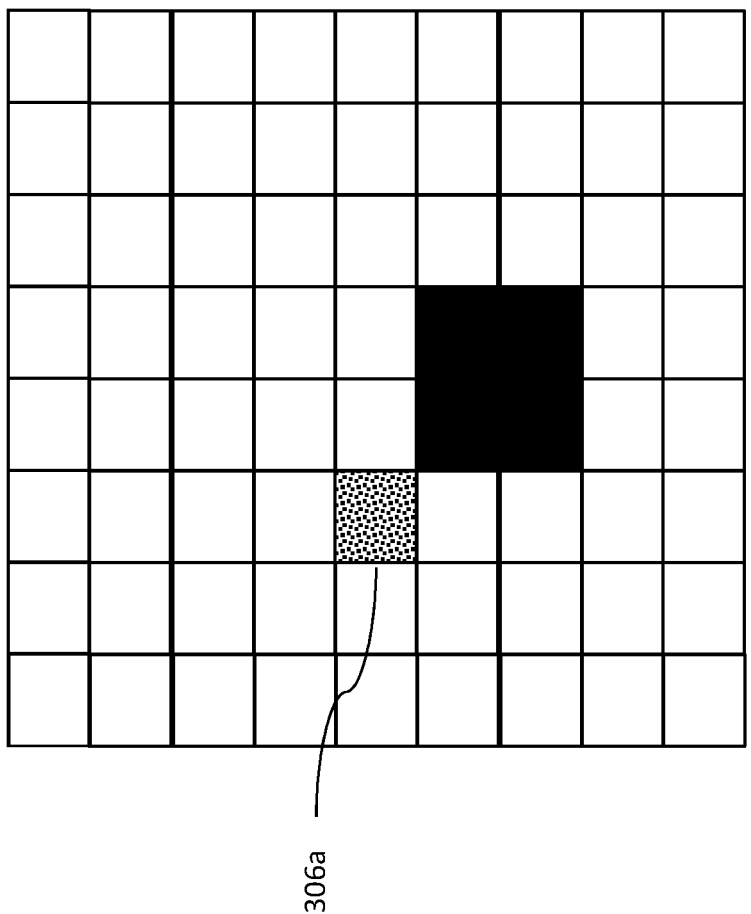
FIG. 4B depicts a second stage of an example importance-based image block storage sequence according to embodiments of the present invention.
Figure 4C:
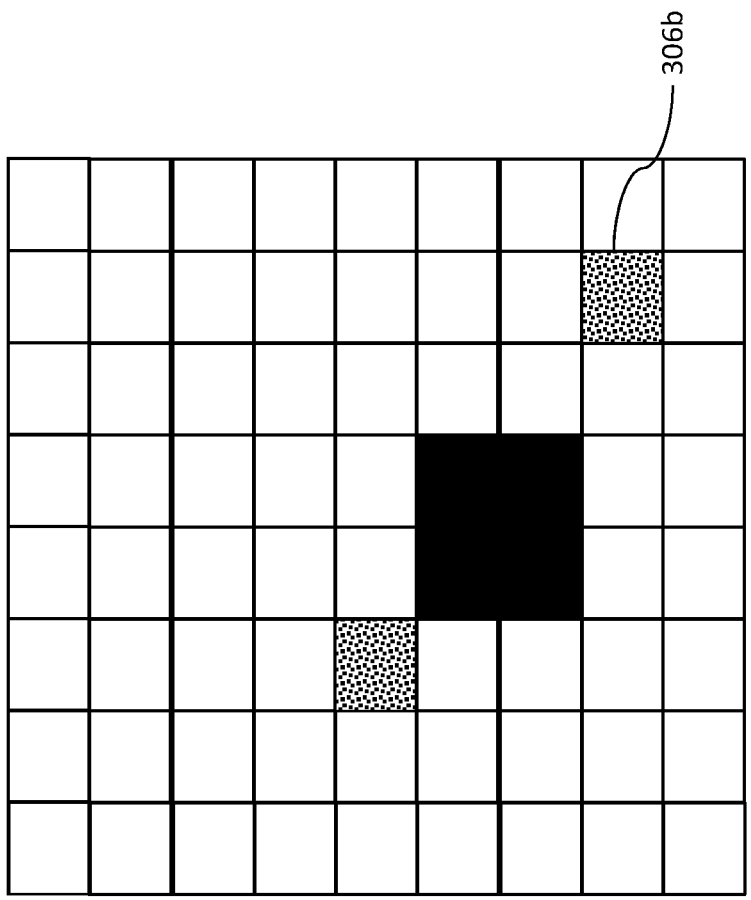
FIG. 4C depicts a third stage of an example importance-based image block storage sequence according to embodiments of the present invention.
Figure 4D:
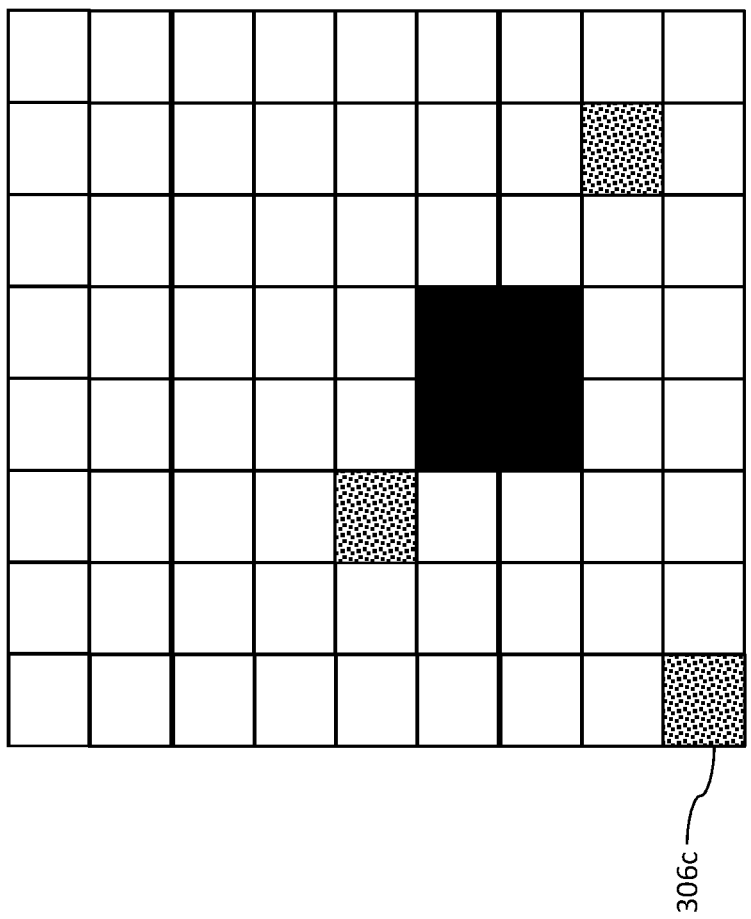
FIG. 4D depicts a fourth stage of an example importance-based image block storage sequence according to embodiments of the present invention.
Figure 4E:
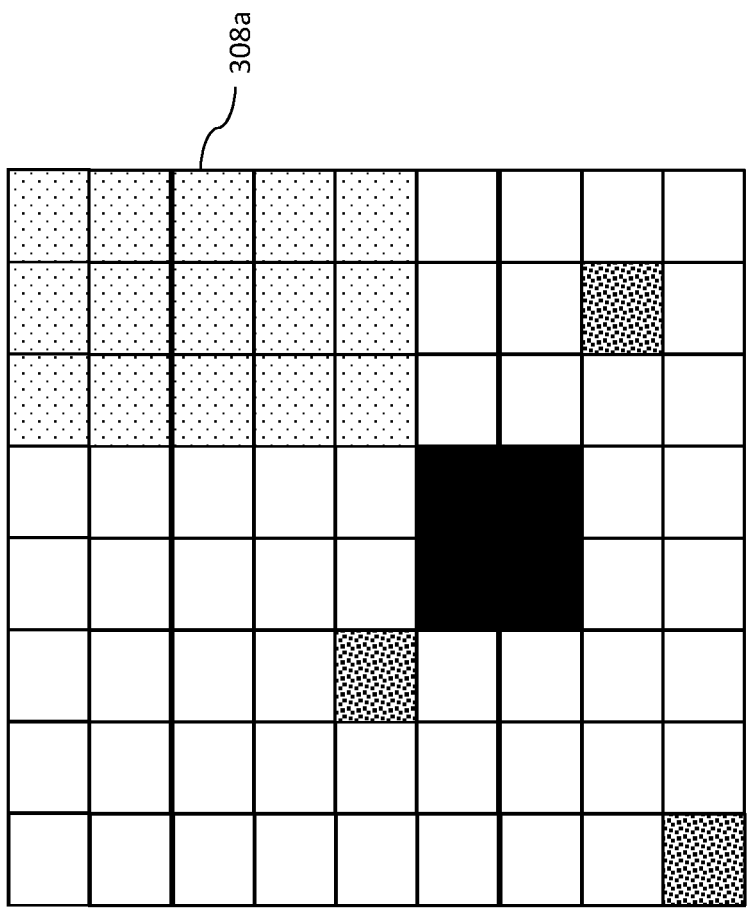
FIG. 4E depicts a fifth stage of an example importance-based image block storage sequence according to embodiments of the present invention.
Figure 4F:
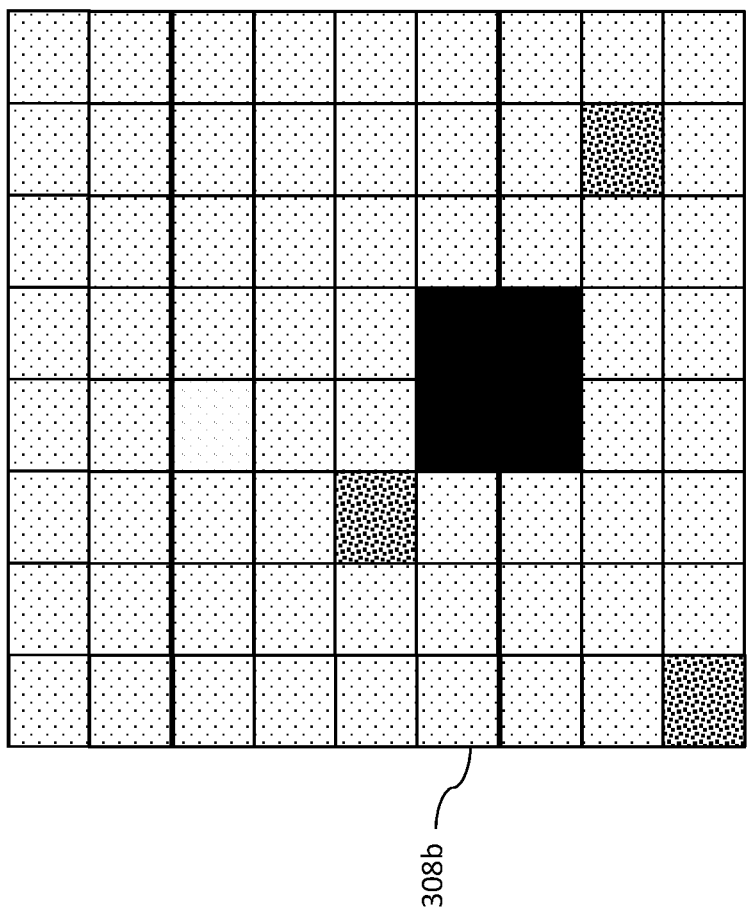
FIG. 4F depicts a sixth stage of an example importance-based image block storage sequence according to embodiments of the present invention.

The image block sequencing engine 112 can, based on the determined sequence, cause one or more image blocks of an image to be stored by processing system 100 (e.g., using memory 104 and/or data store 122) and/or transmitted to remote device 120, for rendering in sequence. FIGS. 4A-4F depict an example sequence of storage of the image blocks of the example importance-based output image 302 shown in FIG. 3B. First, as shown in FIG. 4A, the first image area 304 having the high level of importance would be stored. In a case in which there are more than one image areas having a high level of importance, the other image areas of high importance would be stored next. The order of the storage of image areas of the same level of importance follows the sequence, which can, according to various embodiments, be ordered based on: the confidence level associated with each image area (e.g., the image blocks of the image areas associated with the highest confidence level are first in the sequence), the number of blocks associated with each image area (e.g., the image blocks of the image area with the highest number of image blocks are the first in the sequence), a pseudo-randomly selected order performed by the image block sequencing engine 112, an order of image block number as reflected by the example shown in FIG. 3A (e.g., the image block having the lowest number is first in the sequence), use of the distance-to-results values as described herein, a user customized approach (e.g., a user may designate a type of defect as having a higher importance level than another type of defect) or any other suitable approach to ordering image blocks of the same importance level. FIGS. 4B-4D show the sequential storage of the image blocks of the second image areas 306, which have a medium level of importance. In this example, a first medium importance image block 306a is stored first, followed by a second medium importance image block 306b, followed by a third medium importance image block 306c. This order of image blocks having a medium importance level reflects the "distance to results" values of each such image block, as of the 3 image blocks having a medium importance level, the image blocks are stored in order of which block is closest to the first image area 304 having a high importance level. As shown in FIG. 4E-4F, the third image area 308 having a low importance is stored at the end of the sequence. As the third image area 308 contains a large number of blocks, it will most likely take the longest amount of time and storage space to store, and thus, can be stored in stages as reflected by the first set of low importance image blocks 308a followed by the second set of low importance image blocks 308b. Although the description of FIGS. 4A-4F discusses a sequence for storing the various image blocks, it will be understood that the sequence represented by these figures can also apply to the transmission and/or rendering of the image blocks.

According to some embodiments, image block sequencing engine 112 can apply a compression algorithm to the sequenced image blocks of an image prior to storage and/or transmission of the image blocks to reduce the amount of data used to represent the image. For example, in some embodiments, the processing system 100 can include an encoder-decoder (not shown) to compress image layers and the remote device 120 can include a decoder to decompress the image layers. The encoder/decoder can be used to train a transformation logic that can be used to rebuild an image. For example, a good image template can be sent from the processing system 100 to the remote device 120. Subsequent images (e.g., images obtained for quality control purposes) then do not need to be transmitted in their entirety to the remote device 120, but rather the processing system 100 can just send the transformation logic (which is of much smaller size) to the remote device 120, and the remote device 120 can rebuild the image based on the good image template and the transformation logic. The transformation logic can indicate how the data of an image should be transformed to reduce the amount of data needed to represent the image. For example, in some embodiments, the transformation logic can be a compression and extraction logic that allows the encoder to compress an image to a feature matrix of an image using a good image template (i.e., an image of the same object without defects) and allows the decoder to reconstruct the original image. The encoder/decoder can be used to reduce the amount of data that is stored or sent as network packages. According to some embodiments, the processing system 100 can include an encoder/decoder and the remote device 120 can include at least a decoder to use the transformation logic to reconstruct an image.

In some embodiments, the compression algorithm can eliminate the storage and/or transmission of image blocks having a low level of importance. For example, in some embodiments, the image block sequencing engine 112 may only cause processing system 100 to store and/or transmit image blocks having a medium or a high level of importance, to reduce the amount of data that is stored or transmitted. In such cases, the processing system 100 can store a reference image, which can represent an item without any defects. The reference image can be transmitted to the remote device 120 in advance of obtaining and/or processing a new image with the camera 106 and/or GPU 108 or otherwise pre-stored by the remote device 120. For example, in relation to the inspection of LCD panels, the reference image can be an image of an LCD panel that has no defects. In general, image blocks having a low importance level will represent portions of the image that have no defects and so these portions of an image can be assumed to match the corresponding portions of the reference image.

According to some embodiments, once a new image is received and processed, the processing system can store only the image blocks having a high or medium importance level (e.g., stored in sequence of importance) and will only transmit these image blocks to the remote device 120 for rendering. Thus, the remote device 120 having previously received the reference image, can receive data representing image blocks having a high or medium level of importance and can render the image for inspection by the user 121 by replacing the corresponding image blocks in the reference image with the received image blocks having the high and medium levels of importance. The remote device can render these received blocks in the order of the predetermined sequence, such that the image blocks with the higher levels of importance are rendered first. In this way, the system can reduce the amount of data that is stored and transmitted by processing device and rendered by the remote device 120. In other words, instead of receiving and rendering a full image every time a new image is obtained, the remote device 120 can simply modify the previously received/rendered reference image to replace the image blocks corresponding to the received image blocks that are suspected to include defects (i.e., have a high or medium importance level) to much more quickly render the final image for inspection by the user 121. In some embodiments, remote device 120 may not even render large portions of the image that only include image blocks with a low level of importance, but can, for example, only render image blocks with a low level of importance within a specified distance from the image blocks having high or medium levels of importance. Thus, the remote device 120 can show the most important areas related to an inspection to a user 121 first (or alternatively, exclusively) to accelerate the review of inspection results and decrease the amount of data transferred and time to render the inspection image.

Figure 5:
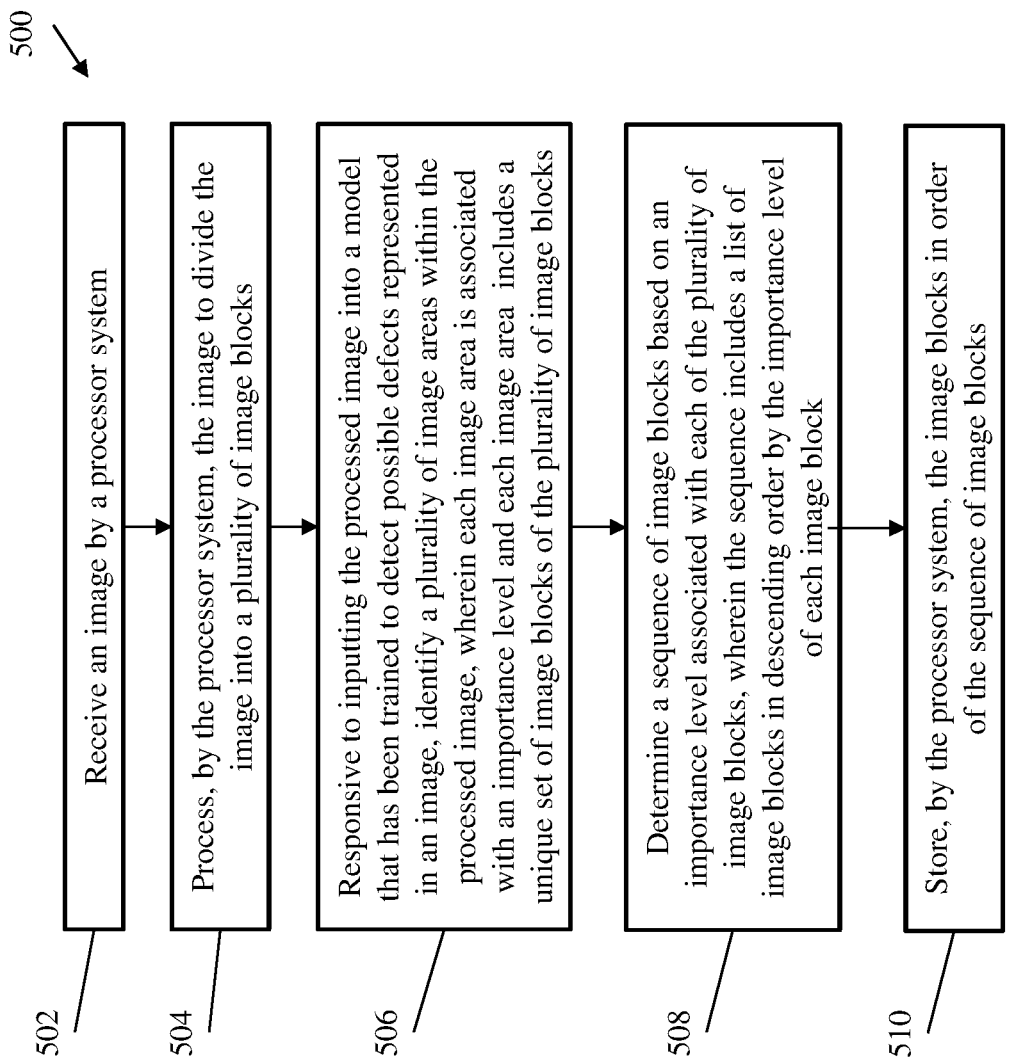
FIG. 5 illustrates a flow diagram of a process for providing improved visualization of inspection results in accordance with one or more embodiments of the present invention.

Turning now to FIG. 5, a flow diagram of a method 500 for providing improved visualization of inspection results in accordance with an embodiment is shown. In one or more embodiments of the present invention, the method 500 can be embodied in software that is executed by processing system 100 or embodied in computer elements located within a network that can reside in the cloud, such as the cloud computing environment 50 described herein above and illustrated in FIGS. 7 and 8. In other embodiments, the computer elements can reside on a computer system or processing system, such as the processing system 900 described herein above and illustrated in FIG. 9, or in some other type of computing or processing environment.

The method 500 begins at block 502 and includes receiving, by a processor system (e.g., via processing system 100), an image of, for example, an item or object of manufacture (e.g., an image of an object that is on an assembly line). According to some embodiments, the image can be obtained from a camera that is connected (e.g., via a local connection) to the computing device. According to some embodiments, the obtained image can be a high definition image. In some embodiments, the obtained image can be a digital image.

As shown at block 504, the method includes processing, by the processor system (e.g., GPU 108) the image to divide the image into a plurality of image blocks. As will be appreciated by those of skill in the art, a GPU 108 can be used to accelerate the processing of images, however in other embodiments a central processing unit (CPU) could alternatively be used, although it will generally be slower. According to some embodiments, each image block can be a square area made up of a predetermined number of pixels (e.g., 1 pixel, 4 pixels, 9 pixels, 16 pixels, etc.). In some embodiments, each image block can be any predetermined shape and/or number of pixels.

As shown at block 506, the method includes identifying, by the processor system (e.g. via processing device 102), a plurality of image areas within the processed image in response to inputting the processed image into a model that has been trained to detect possible defects represented in an image. For example, in some embodiments, a model, such as a neural network, can have been previously trained to detect possible defects in an image of a specified item of manufacture (e.g., in an image of an LCD screen). Each image area is associated with an importance level and each image area includes a unique set of image blocks of the plurality of image blocks. For example, as described above, the trained model can define image areas within the image that each have associated levels of importance.

According to some embodiments, identifying a plurality of image areas within the processed image can include determining zero or more first image areas having a first level of importance, zero or more second image areas having a second level of importance and one or more third image areas having a third level of importance. According to some embodiments, the first level of importance corresponds to a first level of confidence (e.g., as determined by the trained model) of an existence of a defect in the zero of more first image areas, the second level of importance corresponds to a second level of confidence of an existence of a defect in the zero of more second image areas and the third level of importance corresponds to a third level of confidence of an existence of a defect in the third image areas. The first levels of importance/confidence can correspond to high levels of importance/confidence, the second levels of importance/confidence can correspond to medium levels of importance/confidence and the third levels of importance/confidence can correspond to low levels of importance/confidence. Thus, in some embodiments, the first level of confidence is greater than the second level of confidence, which is greater than the third level of confidence. According to some embodiments, each level of confidence can be associated with a specified confidence threshold. For example, in some embodiments, a confidence level of 80% and above can correspond to a "high" confidence level, a confidence level of between 40% and 80% can correspond to a "medium" confidence level and a confidence level below 40% can correspond to a "low" confidence level. It will be understood that these percentages are merely exemplary and the thresholds that define each level of confidence can be any level of confidence that is, for example, selected by a user or automatically determined by the model (e.g., via applying clustering techniques to the data). In other words, according to some embodiments, the areas designed by the trained model as having a high level of importance can be areas in which the model has determined with a high confidence that a defect is represented and similarly areas with a medium level of importance are associated with a medium level of confidence that the image areas represent a defect. In some embodiments, areas designated as having a low level of importance can be areas in which the models has determined that there is a low confidence that a defect is represented within those areas of the image. According to some embodiments, each level of confidence can be determined by corresponding threshold level(s) of confidence that, for example, can be defined by a user of the system.

In some embodiments, each of the plurality of image areas within the processed image is identified based on boundaries and a heat map output by the model in response to inputting the processed image into the model. As will be appreciated by those of skill in the art, a heatmap can be an internal output of a detection model that can describe to what extent a set of adjacent pixels of an image represent a defect. The heatmap can be used to locate where one or more defects are within an image and can be used as the support for the final output bounding box(es) that define the locations of possible defects As shown at block 508, the method includes determining, by the processor system (e.g., via processing device 102), a sequence of image blocks based on an importance level associated with each of the plurality of image blocks. In some embodiments, the sequence can include a list of image blocks in descending order by the importance level of each image block. In other words, the image blocks with the highest levels of importance can be listed first in the sequence, whereas the image blocks having the lowest levels of importance can be positioned at the end of the sequence, with image blocks having a medium level of importance being positioned in the middle of the sequence.

According to some embodiments, determining a sequence of image blocks based on an importance level associated with each of the plurality of image blocks can include: placing each image block of the zero or more first image areas at a beginning of the sequence; placing each image block of the zero or more second image areas at a middle of the sequence; and placing each image block of the one or more third image areas at an end of the sequence. Thus, in some embodiments, the processing system 100 can determine a sequence of the image blocks that is ordered based on the level of importance associated with each image block or image area.

As shown at block 510, the method includes storing, by the processor system (e.g., via memory 104 or data store 122), the image blocks in the order of the sequence of image blocks. In some embodiments, storing the image blocks in order of the sequence of image blocks can include storing the image blocks in order starting with the beginning of the sequence followed by the middle of the sequence and finishing with the end of the sequence. In other words, image blocks having a higher level of importance can be stored first, followed by image blocks having a medium level of importance, followed by image blocks having a low level of importance. According to some embodiments, only image blocks having a high or medium level of importance may be included in the sequence, with image blocks having a low level of importance being omitted. Thus, in some embodiments, only image blocks having a high or medium level of importance may be stored, while image blocks having a low level of importance can be deleted.

According to some embodiments, the method 500 may further include outputting (e.g., via defect detection model 110) a distance to results value by the model for each image block of the zero or more second image areas and ordering each image block of the zero or more second image areas within the middle of the sequence based on the distance to results value of each image block of the zero or more second image areas. As discussed previously above, in some embodiments, the processing system 100 can use the distance to results values of one or more image areas/blocks to determine an order of image blocks having the same level of importance (e.g., all image blocks having a medium importance level) within the sequence, such that image blocks that are closer to image block(s) having a high level of importance can be placed in the sequence before image blocks of the same importance level that are further away from the image block(s) having a high level of importance.

In some embodiments, the method 500 may further include applying (e.g., via processing device 102) a compression algorithm to the plurality of image blocks to generate a prior to storing the image blocks. According to some embodiments, the compression algorithm can be applied after the sequence of importance blocks has been generated. As will be appreciated by those of skill in the art, a compression algorithm (of which there are many known in the art) can reduce the amount of data used to represent the image blocks, and thus reduce the amount of data needed to store and/or transmit the blocks. According to some embodiments, the input of the compression algorithm can be a stream of binary data representing the pixels of a given block or image and the output of the compression algorithm can be a smaller stream of binary data that represents the compressed data. The stored image blocks can be compressed image blocks. According to some embodiments, the compression algorithm can involve removing all image blocks that have a low level of importance from the sequence, such that these image blocks will not be stored or transmitted.

In some embodiments, the method 500 may further include transmitting (e.g., via processing system 100) the compressed image blocks to a remote device for rendering of the image based on the compressed image blocks. The compressed image blocks can be transmitted in order of the sequence. For example, as described above, image blocks having a higher importance level can be transmitted before image blocks having a lower importance level to ensure that the most important image areas are rendered first by the remote device 120.

In some embodiments, transmitting the compressed image blocks to the remote device for rendering of the image can include transmitting a reference image to the remote device and transmitting each image block of the zero or more first image areas and each image block of the zero or more second image areas in sequence. The reference image can include a set of image blocks wherein none of the set of image blocks represents a visual defect. In other words, the reference image can be an image of an article of manufacture (e.g., an image of an LCD panel) that is without defects. The user device can render the image by replacing one or more image blocks of the reference image with each image block of the zero or more first image areas and each image block of the zero or more second image areas.

Figure 6:
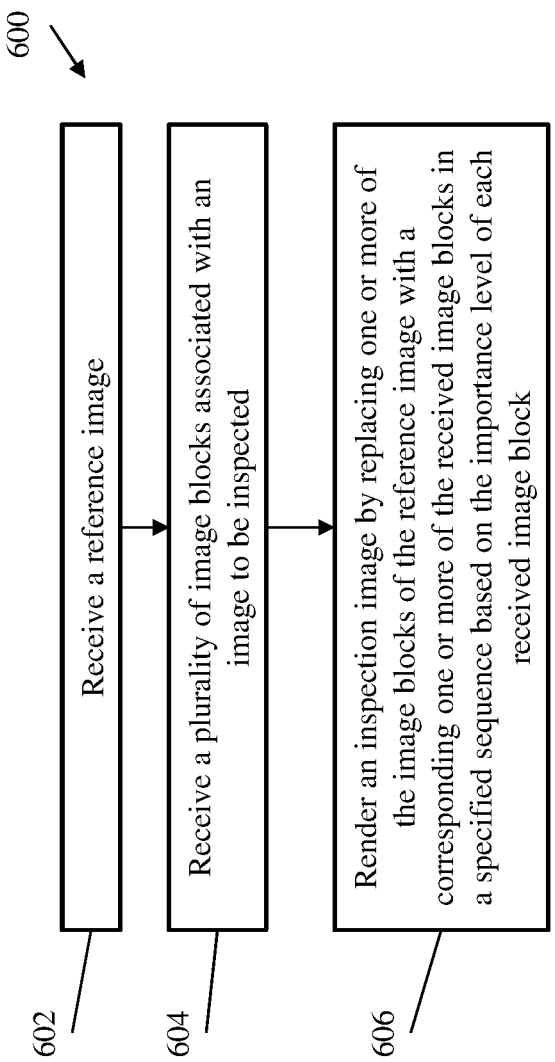
FIG. 6 illustrates a flow diagram of another process for providing improved visualization of inspection results in accordance with one or more embodiments of the present invention.

Turning now to FIG. 6, a flow diagram of another method 600 for providing improved visualization of inspection results in accordance with an embodiment is shown. In one or more embodiments of the present invention, the method 600 can be embodied in software that is executed by remote device 120 or embodied in software that is executed by computer elements located within a network that can reside in the cloud, such as the cloud computing environment 50 described herein above and illustrated in FIGS. 7 and 8. In other embodiments, the computer elements can reside on a computer system or processing system, such as the processing system 900 described herein above and illustrated in FIG. 9, or in some other type of computing or processing environment.

The method 600 begins at block 602 and includes receiving (e.g., via a remote device 121) a reference image. The reference image can be an image of an object of manufacture that does not have any visible defects.

As shown at block 604, the method includes receiving (e.g., via a remote device 121) a plurality of image blocks associated with an image to be inspected. For example, the received image blocks can be from an image objected by a camera 106 of the processing system 100 that has been processed by the GPU 108, defect detection model 110, and/or the image block sequencing engine 112. The received image blocks can each be associated with a high, medium or low importance level. In some embodiments, the received image blocks can be associated with either only a high or medium importance level. The received image blocks can be received in a specified sequence based on importance, such that the most important image blocks are received first.

As shown at block 606, the method includes rendering (e.g., via remote device 120) an inspection image by replacing one or more image blocks of the reference image with a corresponding one or more of the received image blocks.

According to some embodiments, rendering the inspection image can include replacing the one or more image blocks of the reference image with the corresponding one or more of the received image blocks in a specified sequence in order of importance level of each image block, such that the most important image blocks are rendered first.

According to some embodiments, the method 600 can include receiving (e.g., via remote device 120) a user input indicative of the presence of a defect in the image of the item of manufacture. In response, the remote device 120 can transmit a message to the processing system 100 to take a corrective action with respect to the item of manufacture, such as flagging the item for removal from the manufacturing process, automatically removing the item from the manufacturing process to be disposed of or repaired.

Additional processes may also be included. It should be understood that the processes depicted in FIGS. 5 and 6 represent illustrations, and that other processes may be added or existing processes can be removed, modified, or rearranged without departing from the scope and spirit of the present disclosure.

Figure 7:
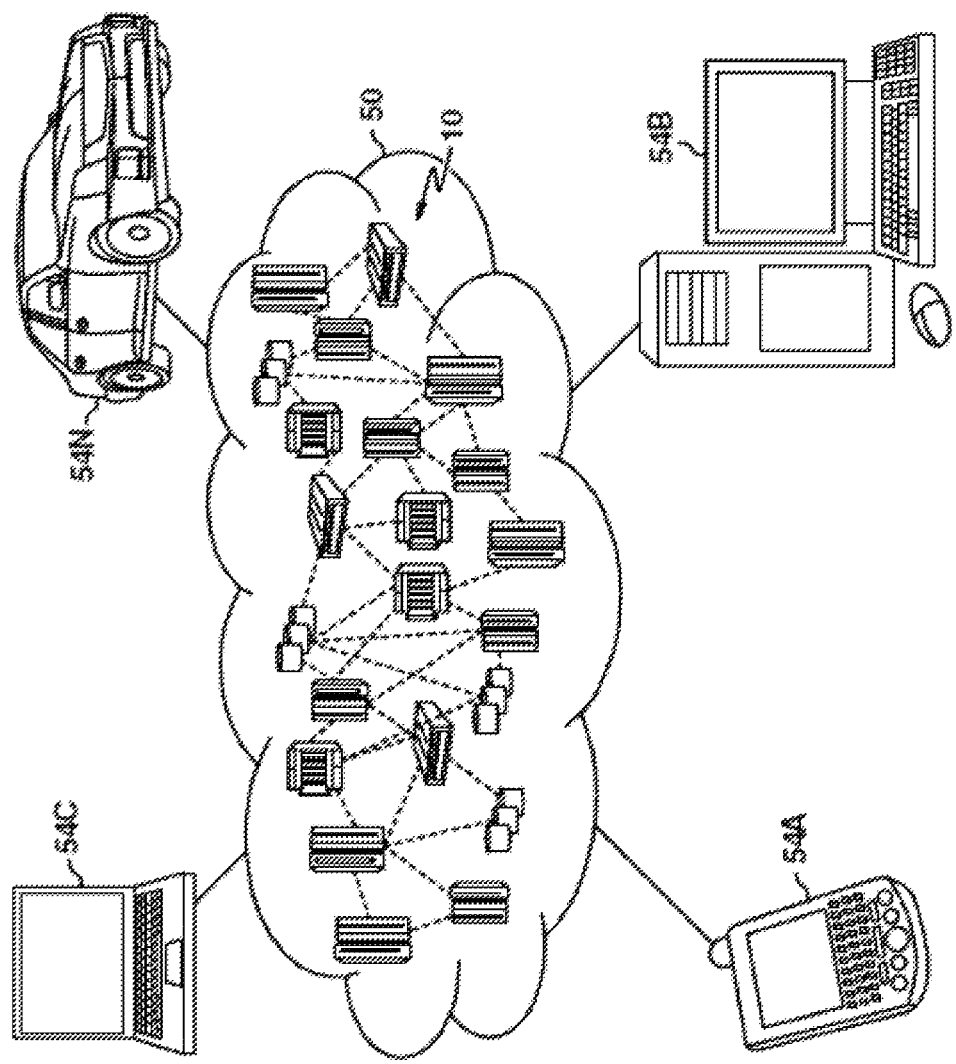
FIG. 7 illustrates a cloud computing environment according to one or more embodiments of the present invention.
Figure 8:
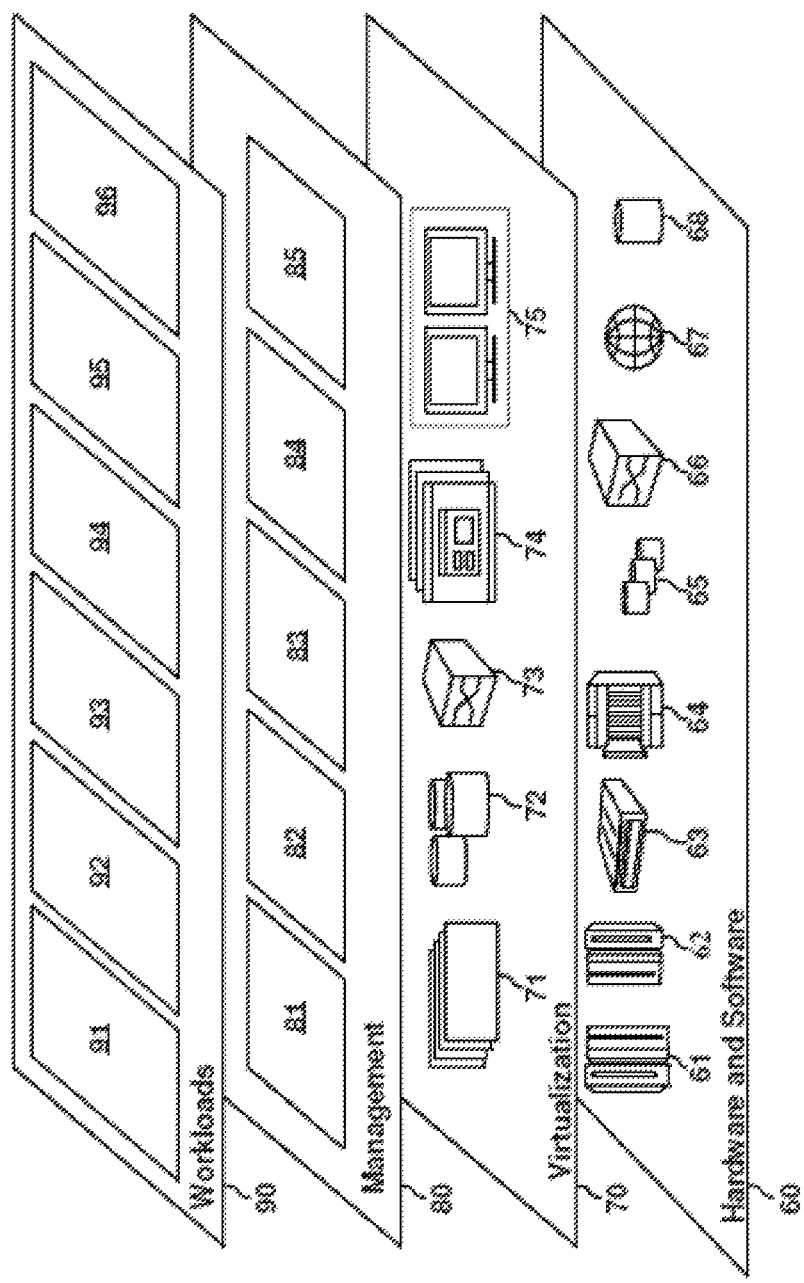
FIG. 8 illustrates abstraction model layers according to one or more embodiments of the present invention.

FIG. 7 depicts a cloud computing environment according to one or more embodiments of the present invention. FIG. 8 depicts abstraction model layers according to one or more embodiments of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing improved visualization of inspection results 96.

Figure 9:
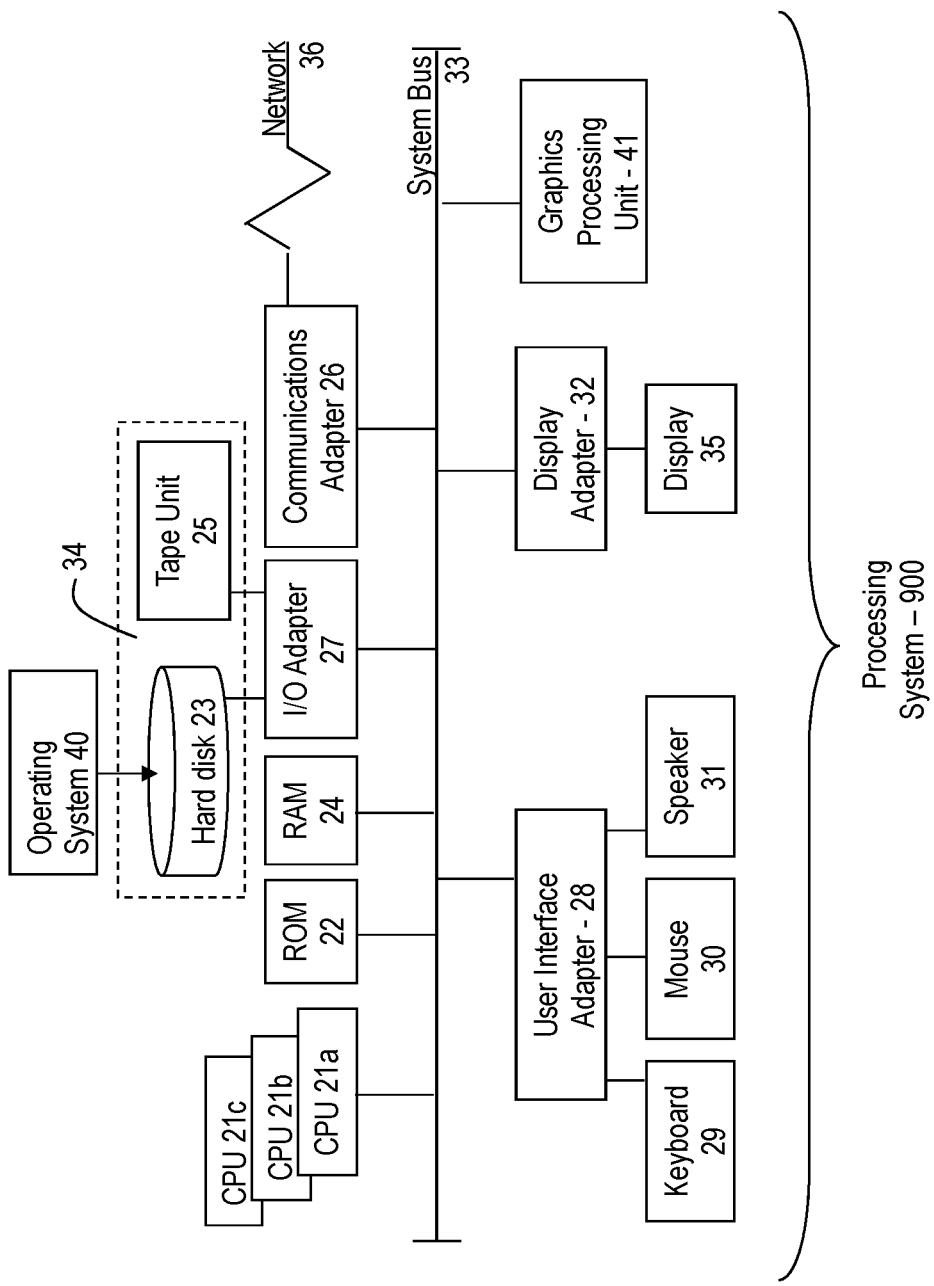
FIG. 9 illustrates a block diagram of a computer system for use in implementing one or more embodiments of the present invention.

FIG. 9 depicts a processing system for implementing one or more embodiments of the present invention. It is understood that one or more embodiments of the present invention are capable of being implemented in conjunction with any other type of computing environment now known or later developed. For example, FIG. 9 depicts a block diagram of a processing system 900 for implementing the techniques described herein. In accordance with one or more embodiments of the present invention, processing system 100 and/or system 900 can be an example of a cloud computing node 10 of FIG. 7. In the embodiment shown in FIG. 9, processing system 900 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 900.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 900 can be stored in mass storage 34. The RAM 24, ROM 22, and mass storage 34 are examples of memory 19 of the processing system 900. A network adapter 26 interconnects system bus 33 with an outside network 36 enabling the processing system 900 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 900 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 900 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 900.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, by a processor system, an image;
processing, by the processor system, the image to divide the image into a plurality of image blocks;
responsive to inputting the processed image into a model that has been trained to detect possible defects represented in an image, identifying, by the processor system, a plurality of image areas within the processed image, wherein each image area is associated with an importance level and each image area comprises a unique set of image blocks of the plurality of image blocks;
determining, by the processor system, a sequence of image blocks based on an importance level associated with each of the plurality of image blocks, wherein the sequence comprises a list of image blocks in descending order by the importance level of each image block; and storing, by the processor system, the image blocks in order of the sequence of image blocks.

2. The computer-implemented method of claim 1, wherein identifying a plurality of image areas within the processed image comprises determining zero or more first image areas having a first level of importance, zero or more second image areas having a second level of importance and one or more third image areas having a third level of importance.

3. The computer-implemented method of claim 2, wherein the first level of importance corresponds to a first level of confidence of an existence of a defect in the zero of more first image areas and the second level of importance corresponds to a second level of confidence of an existence of a defect in the zero of more second image areas, wherein the first level of confidence is greater than the second level of confidence.

4. The computer-implemented method of claim 3, wherein determining a sequence of image blocks based on an importance level associated with each of the plurality of image blocks comprises:
    placing each image block of the zero or more first image areas at a beginning of the sequence;
    placing each image block of the zero or more second image areas at a middle of the sequence; and
    placing each image block of the one or more third image areas at an end of the sequence.

5. The computer-implemented method of claim 4 further comprising:
    outputting, by the model for each image block of the zero or more second image areas, a distance to results value; and
    ordering, each image block of the zero or more second image areas within the middle of the sequence based on the distance to results value of each image block of the zero or more second image areas.

6. The computer-implemented method of claim 5, wherein storing the image blocks in order of the sequence of image blocks comprises storing the image blocks in order starting with the beginning of the sequence followed by the middle of the sequence and finishing with the end of the sequence.

7. The computer-implemented method of claim 6 further comprising applying a compression algorithm to the plurality of image blocks prior to storing the image blocks, wherein the stored image blocks comprise compressed image blocks.

8. The computer-implemented method of claim 7 further comprising transmitting the compressed image blocks to a remote device for rendering of the image based on the compressed image blocks, wherein the compressed image blocks are transmitted in order of the sequence.

9. The computer-implemented method of claim 8, wherein transmitting the compressed image blocks to the remote device for rendering of the image comprises:
    transmitting a reference image to the remote device, wherein the reference image comprises a set of image blocks wherein none of the set of image blocks represents a visual defect; and
    transmitting each image block of the zero or more first image areas and each image block of the zero or more second image areas in sequence;
    wherein the user device renders the image by replacing one or more image blocks of the reference image with each image block of the zero or more first image areas and each image block of the zero or more second image areas.

10. The computer-implemented method of claim 1, wherein each of the plurality of image areas within the processed image is identified based on boundaries and a heat map output by the model in response to inputting the processed image into the model.

11. A system comprising:
    a camera;
    a processor system;
    a memory having computer readable instructions; and
    the processor system configured to execute the computer readable instructions to cause the processor system to perform operations comprising:
        processing an image to generate a processed image divided into a plurality of image blocks;
        responsive to inputting the processed image into a model that has been trained to detect possible defects represented in an input image, identifying a plurality of image areas within the processed image, wherein each image area is associated with an importance level and each image area comprises a unique set of image blocks of the plurality of image blocks;
        determining a sequence of image blocks based on an importance level associated with each of the plurality of image blocks, wherein the sequence comprises a list of image blocks in descending order by the importance level of each image block; and
        storing the image blocks in order of the sequence of image blocks.

12. The system of claim 11, wherein identifying a plurality of image areas within the processed image comprises determining zero or more first image areas having a first level of importance, zero or more second image areas having a second level of importance and one or more third image areas having a third level of importance.

13. The system of claim 12, wherein the first level of importance corresponds to a first level of confidence of an existence of a defect in the zero of more first image areas and the second level of importance corresponds to a second level of confidence of an existence of a defect in the zero of more second image areas, wherein the first level of confidence is greater than the second level of confidence.

14. The system of claim 13, wherein determining a sequence of image blocks based on an importance level associated with each of the plurality of image blocks comprises:
    placing each image block of the zero or more first image areas at a beginning of the sequence;
    placing each image block of the zero or more second image areas at a middle of the sequence; and
    placing each image block of the one or more third image areas at an end of the sequence.

15. The system of claim 14, wherein the operations further comprise:
    outputting, by the model for each image block of the zero or more second image areas, a distance to results value; and
    ordering, each image block of the zero or more second image areas within the middle of the sequence based on the distance to results value of each image block of the zero or more second image areas.

16. The system of claim 11, wherein each of the plurality of image areas within the processed image is identified based on boundaries and a heat map output by the model in response to inputting the processed image into the model.

17. A computer program product for providing improved visualization of inspection results, the computer program product comprising a computer readable storage medium having program instructions embodied therewith, the program instructions executable by processor system to cause the processor system to perform a method comprising:

receiving an image from a camera connected to the computing device;

processing the image to divide the image into a plurality of image blocks;

responsive to inputting the processed image into a model that has been trained to detect possible defects represented in an image, identifying a plurality of image areas within the processed image, wherein each image area is associated with an importance level and each image area comprises a unique set of image blocks of the plurality of image blocks;

determining a sequence of image blocks based on an importance level associated with each of the plurality of image blocks, wherein the sequence comprises a list of image blocks in descending order by the importance level of each image block;

storing the image blocks in order of the sequence of image blocks.

18. The computer program product of claim 17, wherein identifying a plurality of image areas within the processed image comprises determining zero or more first image areas having a first level of importance, zero or more second image areas having a second level of importance and one or more third image areas having a third level of importance.

19. The computer program product of claim 18, wherein the first level of importance corresponds to a first level of confidence of an existence of a defect in the zero of more first image areas and the second level of importance corresponds to a second level of confidence of an existence of a defect in the zero of more second image areas, wherein the first level of confidence is greater than the second level of confidence.

20. The computer program product of claim 17, wherein each of the plurality of image areas within the processed image is identified based on boundaries and a heat map output by the model in response to inputting the processed image into the model.

* * * * *